(12) United States Patent
Chickering et al.

(10) Patent No.: US 7,831,627 B2
(45) Date of Patent: Nov. 9, 2010

(54) DEPENDENCY NETWORK BASED MODEL (OR PATTERN)

(75) Inventors: David M. Chickering, Bellevue, WA (US); David E. Heckerman, Bellevue, WA (US); Geoffrey J. Hulten, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 875 days.

(21) Appl. No.: 11/324,960

(22) Filed: Jan. 3, 2006

(65) Prior Publication Data

US 2006/0112190 A1 May 25, 2006

Related U.S. Application Data

(62) Division of application No. 10/447,462, filed on May 29, 2003.

(51) Int. Cl.
*G06F 17/30* (2006.01)
(52) U.S. Cl. .................................... 707/798; 707/797
(58) Field of Classification Search ............... 707/6, 707/798, 797
See application file for complete search history.

(56) References Cited

U.S. PATENT DOCUMENTS

| | | | |
|---|---|---|---|
| 6,895,398 B2 * | 5/2005 | Evans-Beauchamp et al. . | 706/50 |
| 2002/0059264 A1 | 5/2002 | Fleming et al. | |
| 2002/0133504 A1 | 9/2002 | Vlahos et al. | |
| 2002/0183984 A1 * | 12/2002 | Deng et al. ................. | 703/1 |
| 2003/0018632 A1 | 1/2003 | Bays et al. | |
| 2003/0055614 A1 | 3/2003 | Pelikan et al. | |
| 2003/0154044 A1 * | 8/2003 | Lundstedt et al. ........... | 702/104 |
| 2004/0068475 A1 * | 4/2004 | Depold et al. ............... | 706/21 |
| 2004/0073539 A1 * | 4/2004 | Dettinger et al. ............ | 707/3 |
| 2004/0153445 A1 | 8/2004 | Horvitz et al. | |
| 2004/0177244 A1 | 9/2004 | Murphy et al. | |
| 2004/0205045 A1 * | 10/2004 | Chen et al. .................. | 707/3 |
| 2009/0063209 A1 * | 3/2009 | Dubois et al. ............... | 705/7 |

OTHER PUBLICATIONS

Heckerman et al., "Dependency Networks for Inference, Collaborative Filtering, and Data Visualization", Journal of Machine Learning Research 1 (2000) p. 49-75, [online],Oct. 2000 [retrieved on Dec. 16, 2008]. Retrieved from the Internet: <http://portal.acm.org/ft_gateway.cfm?id=944735&type=pdf&coll=GUIDE &dl=ACM &CFID=15097073&CFTOKEN=35888240>.*

(Continued)

*Primary Examiner*—Jean B. Fleurantin
*Assistant Examiner*—Dennis Myint
(74) *Attorney, Agent, or Firm*—Lee & Hayes, PLLC

(57) ABSTRACT

A dependency network is created from a training data set utilizing a scalable method. A statistical model (or pattern), such as for example a Bayesian network, is then constructed to allow more convenient inferencing. The model (or pattern) is employed in lieu of the training data set for data access. The computational complexity of the method that produces the model (or pattern) is independent of the size of the original data set. The dependency network directly returns explicitly encoded data in the conditional probability distributions of the dependency network. Non-explicitly encoded data is generated via Gibbs sampling, approximated, or ignored.

19 Claims, 10 Drawing Sheets

OTHER PUBLICATIONS

Heckerman, et al., "Visualization of navigation patterns on a Web site using model-based clustering", The sixth ACM SIGKDD international conference on Knowledge discovery and data mining, 2000, p. 280-284. Retrieved from the Internet:<URL: http://portal.acm.org/ft_gateway.cfm?id=347151&type=pdf&coll=GUIDE&dl=GUIDE&CFID=79190391&CFTOKEN=68813956>.*

Roehrig, Stephen, "Book review: Probabilistic Similarity Networks by David E. Heckerman (The MIT Press, 1991)", ACM SIGART Bulletin archive, vol. 3, Issue 3 (Aug. 1992), p. 9-10. Retrieved from the Internet:<URL: http://portal.acm.org/ft_gateway.cfm?id=1063776&type=pdf&coll=GUIDE&dl=GUIDE&CFID=79190728&CFTOKEN=68993324>.*

Hulten, et al. "Learning Bayesian Networks From Dependency Networks: A Preliminary Study" (2003) 8 pages.

Heckerman, "A Tutorial on Learning with Bayesian Networks" Microsoft Research (Mar. 1995, Revised 1996) 57 pages.

Moore, et al. "Cached Sufficient Statistics for Efficient Machine Learning with Large Databases" (1998) pp. 67-91.

Heckerman, et al. "Dependency Networks for Interference, Collaborative Filtering, and Data Visualization" Microsoft Research (2000) 32 pages.

Jordan, et al. "An introduction to Variational Methods for Graphical Models" (1998) Kluwer Academic Publishers, Boston, 52 pages.

Hulten, et al."Mining Compelx Models from Arbitrarily Large databases in Constant Time" (2002) 7 pages.

Cooper, et al. "A Bayesian Method for the Induction of Probalistic Networks from Data" (Updated Nov. 1993) 43 pages.

Friedman, et al. "Learning Bayesian Network Structure from Massive Datasets: The 'Sparse Candidate' Algorithm" (1999) 10 pages.

Buntine "A Guide to the Literature on Learning Probalilistic Networks from Data" (1996) 17 pages.

Komarek, et al. "A Dynamic Adaptation of AD-trees for Efficient Machine Learning on Large data Sets" (2000) 8 pages.

Domingos, et al. "Mining High-Speed Data Streams" (2000) 10 pages.

Murphy, et al."Loopy Belief Propagating for Approximate Interference: An Empirical Study" (1999) 9 pages.

* cited by examiner

DEPENDENCY NETWORK BASED MODEL (OR PATTERN)

RELATED APPLICATIONS

This application is a divisional application of Ser. No. 10/447,462 filed May 29, 2003, entitled "DEPENDENCY NETWORK BASED MODEL (OR PATTERN)"

TECHNICAL FIELD

The present invention relates generally to data modeling and analysis, and more particularly to utilizing a dependency network to create a model (or pattern).

BACKGROUND OF THE INVENTION

With the advent of the Internet, and especially electronic commerce ("e-commerce") over the Internet, the use of data analysis tools, has increased dramatically. In e-commerce and other Internet and non-Internet applications, databases are generated and maintained that have astronomically large amounts of information. Such information is typically analyzed, or "mined," to learn additional information regarding customers, users, products, etc. This information allows businesses and other users to better implement their products and/or ideas.

Data mining (also known as Knowledge Discovery in Databases—KDD) has been defined as "The nontrivial extraction of implicit, previously unknown, and potentially useful information from data." Data mining can employ machine learning, statistical and/or visualization techniques to discover and present knowledge in a form that is easily comprehensible to humans. Generally speaking, humans recognize or translate graphical items more easily than textual ones. Thus, larger amounts of information can be relayed utilizing this means than by other methods. As such, graphical statistical models have proven invaluable in data mining.

A Bayesian network is a graphical statistical model that encodes probabilistic relationships among variables of interest. Over the last decade, the Bayesian network has become a popular representation for encoding uncertain expert knowledge in expert systems. More recently, researchers have developed methods for learning Bayesian networks from data. When used in conjunction with statistical techniques, the graphical model has several advantages for data analysis. First, because the model encodes dependencies among all variables, it readily handles situations where some data entries are missing. Second, a Bayesian network can be used to learn causal relationships, and hence can be used to gain understanding about a problem domain and to predict the consequences of intervention. Third, because the model has both a causal and probabilistic semantics, it is an ideal representation for combining prior knowledge (which often comes in causal form) and data. And fourth, Bayesian statistical methods in conjunction with Bayesian networks offer an efficient and principled approach for avoiding the over fitting of data.

Although the Bayesian network has proven to be a valuable tool for encoding, learning and reasoning about probabilistic relationships, there are other methods of analysis, such as dependency networks. A dependency network, like a Bayesian network, is a graphical representation of probabilistic relationships. This representation can be thought of as a collection of regressions or classifications among variables in a domain that can be combined using the machinery of Gibbs sampling to define a joint distribution for that domain. The dependency network has several advantages and also disadvantages with respect to a Bayesian network. For example, a dependency network is not useful for encoding causal relationships and is difficult to construct using a knowledge-based approach. Nonetheless, there are straightforward and computationally efficient methods for learning both the structure and probabilities of a dependency network from data; and the learned model is quite useful for encoding and displaying predictive (i.e., dependence and independence) relationships. In addition, dependency networks are well suited to the task of predicting preferences—a task often referred to as collaborative filtering.

Other statistical models include decision trees and decision graphs. A decision tree data structure corresponds generally to an acyclic, undirected graph where nodes are connected to other respective nodes via a single path. The graph is acyclic in that there is no path that both emanates from a vertex and returns to the same vertex, where each edge in the path is traversed only once. A probabilistic decision tree is a decision tree that is used to represent a conditional probability distribution for a target variable given some set of predictor variables. As compared to a table, which is another way to represent a conditional probability distribution when all variables are discrete, a tree is generally a more efficient way of storing probabilities because of its ability to represent equality constraints within a conditional probability distribution.

A decision graph is a further generalization of a decision tree. Similar to a decision tree, a decision graph can represent equality constraints in a conditional probability distribution. In contrast to a decision tree, however, non-root nodes in a decision graph can have more than one parent. This characteristic enables a richer set of relationships to be represented by a decision graph than by a decision tree. For example, relationships between a non-root node and multiple parent nodes can be represented in a decision graph by corresponding edges interconnecting the non-root node with its parent nodes.

There are two traditional approaches for constructing statistical models, such as decision trees or decision graphs, namely, a knowledge-based approach and a data-based approach. Using the knowledge-based approach, a person (known as a knowledge engineer) interviews an expert in a given field to obtain the knowledge of the expert about the field of expertise of the expert. The knowledge engineer and expert first determine the distinctions of the world that are important for decision making in the field of the expert. These distinctions correspond to the variables in the domain of interest. For example, if a decision graph is to be used to predict the age of a customer based on the products that customer bought in a store, there would be a variable for "age" and a variable for all relevant products. The knowledge engineer and the expert next determine the structure of the decision graph and the corresponding parameter values that quantify the conditional probability distribution.

In the data-based approach, the knowledge engineer and the expert first determine the variables of the domain. Next, data is accumulated for those variables, and an algorithm is applied that creates one or more decision graphs from this data. The accumulated data comes from real world instances of the domain. That is, real world instances of decision making in a given field.

Typically, the data-based approach is more commonly utilized from a general stand point. Over the last few years, however, the sizes of these databases have been exponentially increasing as the ability to gather data more efficiently increases. This has produced enormous databases that take immense amounts of time to analyze, despite the ever increasing speeds gained in computer processing technology and storage access techniques.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates generally to data modeling and analysis, and more particularly to utilizing a dependency network to create a model (or pattern). Scalable learning methods are leveraged to obtain models from data previously not learnable by scalable techniques. By efficiently converting a dependency network to a model (or pattern), such as for example a Bayesian network, users gain an ability to analyze extremely large datasets. More particularly, a dependency network is employed to summarize training data for subsequent analysis or for constructing statistical models.

The present invention facilitates data analysis by decreasing the need to directly access large databases through employment of a modeling method based on dependency networks, extending the usefulness of existing models and providing quick and efficient analysis of extremely large databases. Generally, analysis requires direct access to databases to allow information to be formulated to a user. The time spent accessing and converting data increases substantially as the size of the database increases. Thus, this type of direct analysis is not very efficient and is not feasible on very large databases. The present invention drastically decreases the time and computer memory needed to analyze data, allowing processing of databases that were previously too large to analyze, maximizing the utility of existing analysis methods, increasing the ease of use of the information, and providing aspects of analysis previously unobtainable.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
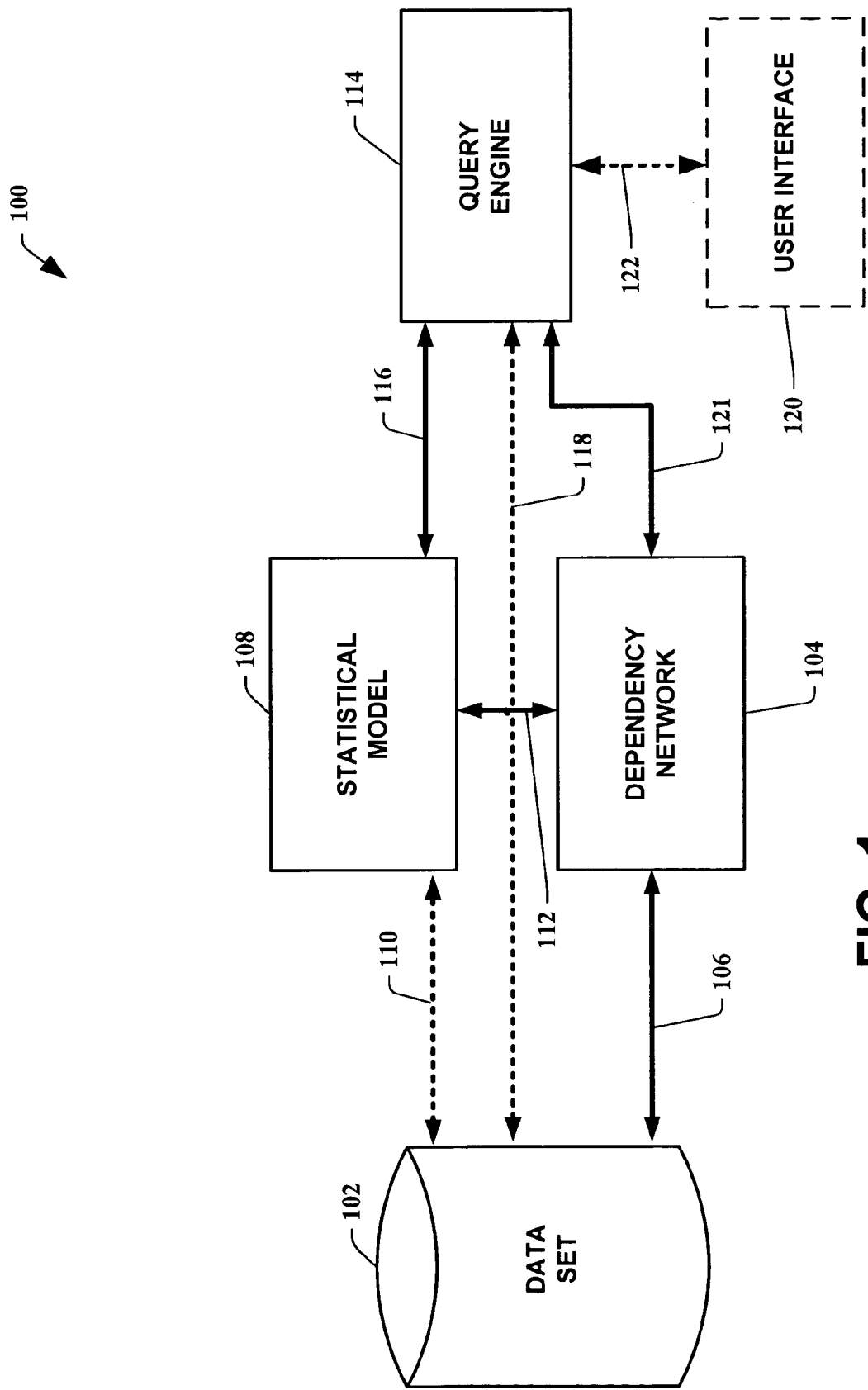
FIG. 1 is a block diagram of an analysis system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers. It is to be appreciated that a model, network, query engine, user interface, comparator, model (or pattern) as described herein can be computer components.

The present invention leverages scalable learning methods to obtain models (or patterns) (statistical models) that could not previously be learned in a scalable manner. A scalable learning method, among other things, is able to operate when training data is too large for RAM (random access memory) and must be paged in from a storage device (e.g., a hard disk) as needed. Previously, non-scalable methods were utilized when scalable ones were not available. As a result, a user would either have extremely long waits for results, or be forced to sub-sample training data and often learn models with lower quality. Users could also develop scalable versions of existing learning methods when needed, but this is a difficult and error prone procedure.

The present invention is also useful when employing dependency networks in a graphical interface. A user may like to get a view of the dependency network from a different structure's perspective, such as from a Bayesian network's perspective, because the differences in the structures of the two models may be informative. The present invention can be utilized to perform the conversion quickly so that it can be used interactively at the interface. This method is much faster than learning a Bayesian network directly, which is what users have done previously in this situation.

A dependency network is employed as a summary of a data set. Some of the statistics about the data are encoded directly in the dependency network; the remaining statistics can be estimated using standard techniques. These statistics and estimates from the dependency network are utilized when learning a different structure, such as for example a Bayesian network, instead of accessing data directly.

The present invention converts models of one type into models of another type without accessing data, allowing users to do more with existing models and learning structures. In one aspect of the present invention, a means converts a dependency network to a Bayesian network. This method of the present invention produces models (or patterns), such as for example a Bayesian network, with a prediction accuracy closely equaling that of a structure learned from a data set directly. The advantages of this aspect of the present invention include, but are not limited to, creation of models (or patterns), (e.g., Bayesian networks), without accessing data; faster than learning models (or patterns) directly; and exploits mature and scalable decision tree induction methods.

This aspect also is enhanced by allowing a means to replace the sub-trees it prunes with a structure more complex than with single leaves. This requires access to sufficient statistics that are not explicitly encoded in the dependency network. Additionally, other aspects of the present invention can employ a range of alternatives including, but not limited to, approximating the needed statistics, inferring them from a complete dependency network using techniques such as Gibbs sampling, and estimating them from the training data. Other aspects of the present invention provide search strategies including, but not limited to, look-ahead and forward search (adding edges from the dependency network to an empty network until further additions introduce cycles). Other aspects of the present invention include the use of dependency networks and Bayesian networks as alternatives for existing cached sufficient statistics structures.

In FIG. 1, a block diagram of an analysis system 100 in accordance with an aspect of the present invention is illustrated. The analysis system 100 includes a data set 102, such as training data, which contains raw information that can be data mined, a dependency network 104 that accesses the data set 102 via an interface 106, a statistical model 108 based on the dependency network 104 with access capability via an optional interface 110 to the data set 102 and an interface 112 to the dependency network 104, and a query engine 114 with an interface 116 to the statistical model 108, and an interface 121 to dependency network 104, and an optional interface 118 directly to the data set 102. The statistical model 108 is a model (or pattern), such as a Bayesian network and a decision tree and the like, based on the dependency network 104. The dependency network 104 summarizes the data set 102. The statistical model 108 learns utilizing statistics and/or estimates corresponding to the data set 102 as summarized in the dependency network 104.

A standard practice in statistics is to use a statistical model for decision making in lieu of direct inspection of the data. Queries for decision making are depicted as query engine 114. The standard use of a statistical model is depicted as the interface 116, whereas direct access to the data corresponds to interface 112. As the dependency network is also a statistical model, it too can be queried for decision making, as depicted in interface 121.

In another aspect of the present invention, the analysis system 100 additionally includes a user interface 120 with an interface 122 to the query engine 114. The user interface 120, such as a graphical user interface (GUI), a machine interface and a remote interface and the like, provides a user (human and/or machine) with the information from the query engine 114.

Figure 2:
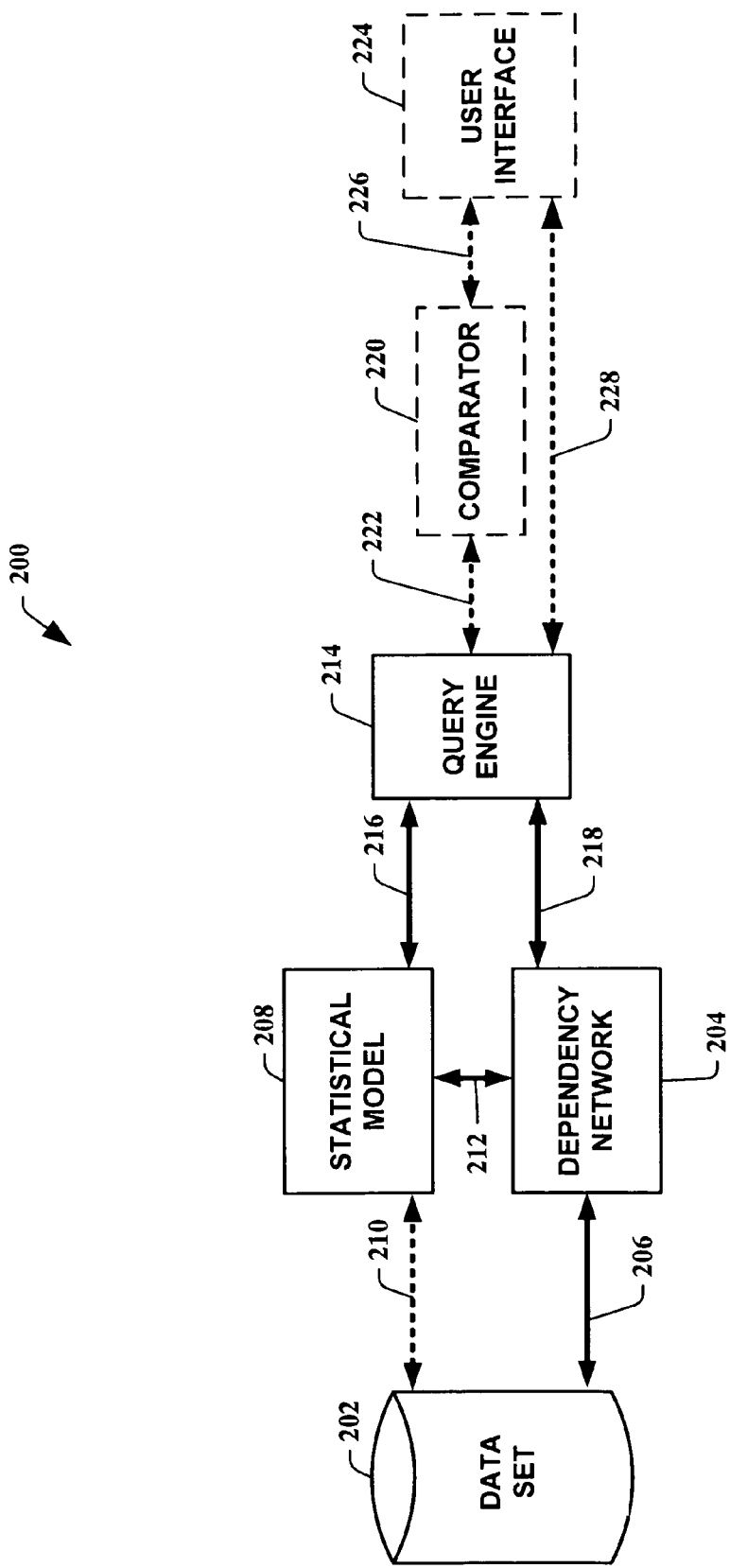
FIG. 2 is another block diagram of an analysis system in accordance with an aspect of the present invention.

Referring to FIG. 2, another block diagram of an analysis system 200 in accordance with an aspect of the present invention is shown. The analysis system 200 comprises a data set 202, a dependency network 204 with an interface 206 with the data set 202, a statistical model 208 with an optional interface 210 to the data set 202 and an interface 212 to the dependency network 204, and a query engine 214 with an interface 216 with the statistical model 208 and an interface 218 with the dependency network 204. The interfaces 216, 218 between the query engine 214 and the statistical model 208 and the dependency network 204, respectively, allow the query engine 214 to retrieve information from both sources 204, 208. This is advantageous as both sources 204, 208 can provide additional information not available from a single source. In another aspect of the present invention, the analysis system 200 additionally includes a comparator 220 with an interface 222 to the query engine 214 and/or a user interface 224 with an interface 226 to the comparator 220 and/or an interface 228 directly to the query engine 214. The comparator 220 can annunciate the differences between the two sources 204, 208 and/or compile additional information not obtainable from only a single source. The user interface 224, such as a graphical user interface (GUI), a machine interface and a remote interface and the like, provides a user (human and/or machine) with the information from the comparator 220 and/or the query engine 214. Thus, a user can interpret raw query information from each source 204, 208 and/or information from the comparator 220 such as deltas and/or new derivation information.

Figure 3:
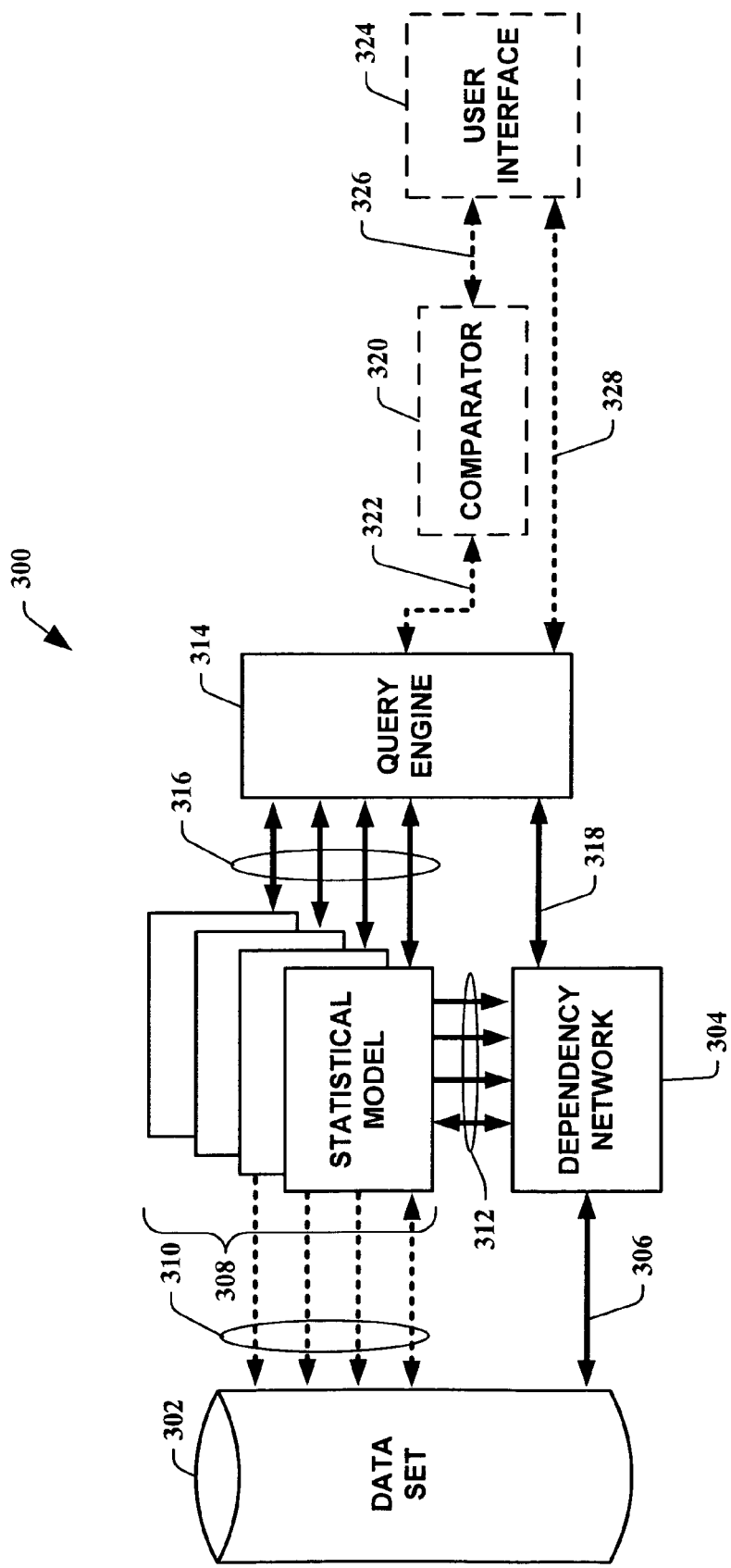
FIG. 3 is yet another block diagram of an analysis system in accordance with an aspect of the present invention.

Turning to FIG. 3, yet another block diagram of an analysis system 300 in accordance with an aspect of the present invention is depicted. The analysis system 300 comprises a data set 302, a dependency network 304 with an interface 306 with the data set 302, a statistical model set 308 with an optional interface set 310 to the data set 302 and an interface set 312 to the dependency network 304, and a query engine 314 with an interface set 316 with the statistical model set 308 and an interface 318 with the dependency network 304. The statistical model set 308 can include any number of statistical models based on the dependency network 304. This allows additional information to be gleaned from different modeling techniques, all based on the dependency network 304. The optional interface set 310 can include a number of optional interfaces, generally related to the number of statistical models. The interface set 316 can include a number of interfaces, generally related to the number of statistical models. The interfaces 316, 318 from the query engine 314 and the statistical model set 308 and the dependency network 304, respectively, allow the query engine 314 to retrieve information from all sources 304, 308. This is advantageous as the sources 304, 308 can provide additional information not available from a single source. In another aspect of the present invention, the analysis system 300 additionally includes a comparator 320 with an interface 322 to the query engine 314 and/or a user interface 324 with an interface 326 to the comparator 320 and/or an interface 328 directly to the query engine 314. The comparator 320 can annunciate the differences between the multiple sources 304, 308 and/or compile additional information not obtainable from only a single source. The user interface 324, such as a graphical user interface (GUI), a machine interface and a remote interface and the like, provides a user (human and/or machine) with the information from the comparator 320 and/or the query engine 314. Thus, a user can interpret raw query information from each source 304, 308 and/or information from the comparator 320 such as deltas and/or new derivation information. One skilled in the art can appreciate that other aspects of the present invention can include multiple query engines, comparators and/or user interfaces. Additionally, an interface (not shown) directly from the query engine 314 to the data set 302 can be provided.

The models (or patterns) (statistical models) themselves can be Bayesian networks, Markov networks, neural networks, SVMs (Support Vector Machines), and naïve Bayes and the like depending on an aspect of the present invention. Conditional distributions utilized within an aspect of the present invention for a model (or pattern) can include machine learning techniques such as decision trees, naïve Bayes, neural networks, SVMs, logistic and linear regressions, and complete tables and the like.

Information can be extracted from a data set (or "structure") by utilizing explicit data found in the dependency network, by going directly to the data set and accessing data, and/or by deriving (or "inferencing") data with Monte Carlo sampling techniques such as Gibbs sampling and the like. In the present invention, the conditional distributions of the model (or pattern) are not required to match the conditional distributions of the dependency network.

Figure 4:
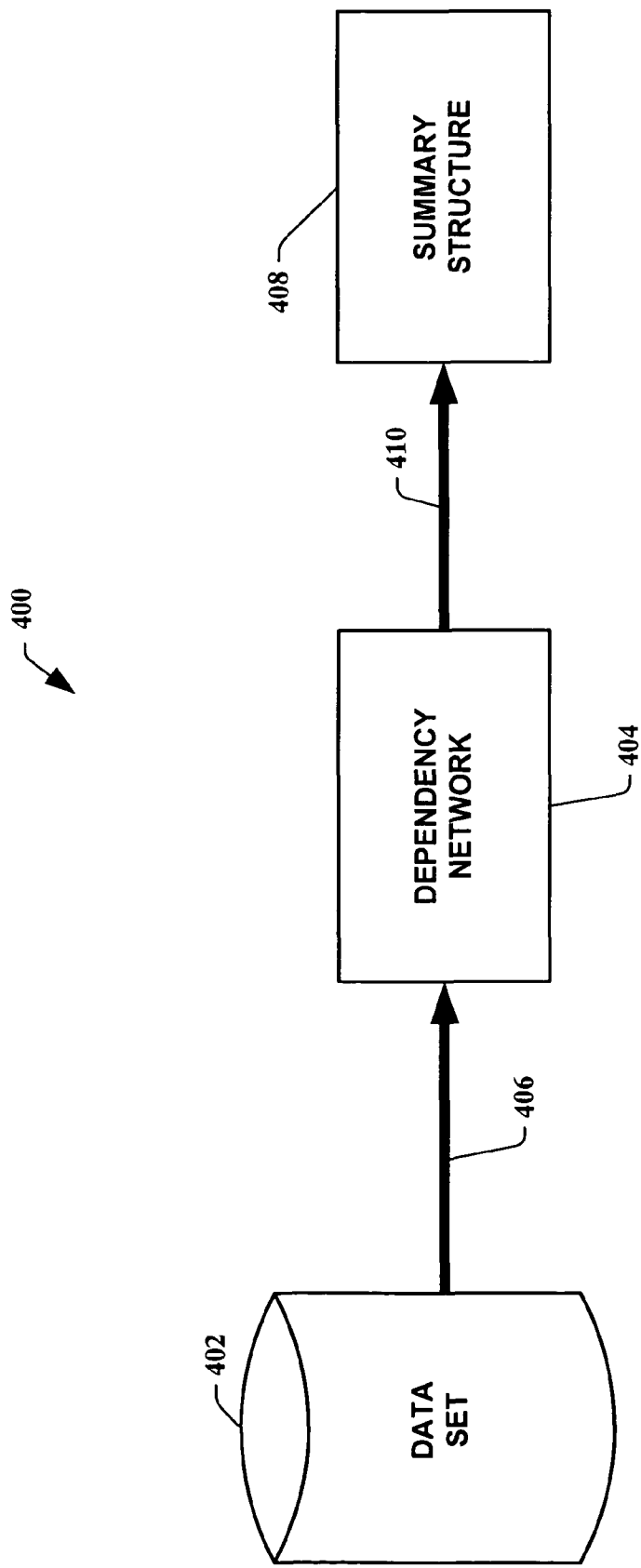
FIG. 4 is a block diagram of a learning structure in accordance with an aspect of the present invention.

Turning to FIG. 4, a block diagram of a learning structure 400 in accordance with an aspect of the present invention is shown. The learning structure 400 includes a data set 402, a dependency network 404 with a means 406 to extract information from the data set, and a model (or pattern) 408 with a learning means 410 to extract information from the dependency network 404. The information extraction means 406 is typically a conventional scalable technique that can be easily applied to large data sets. This allows the formation of the dependency network 404 to occur without requiring additional new and/or complicated processing. Once the dependency network 404 is formed, it becomes an "oracle" for constructing the model (or pattern) 408. The dependency network 404 is typically non-acyclic. The model (or pattern) 408 learns from the dependency network 404 via the learning means 410, discussed in detail infra (see FIG. 5). The model (or pattern) 408, once formed, allows for alternate forms of association data to be gathered from the data set 402 without directly accessing the data set 402. Thus, multiple types of information are gained from the model (or pattern) 408 and/or from the dependency network 404 that are unobtainable with just a single type of information source. The model (or pattern) 408 can supply information independent of the size of the original data set 402.

Figure 5:
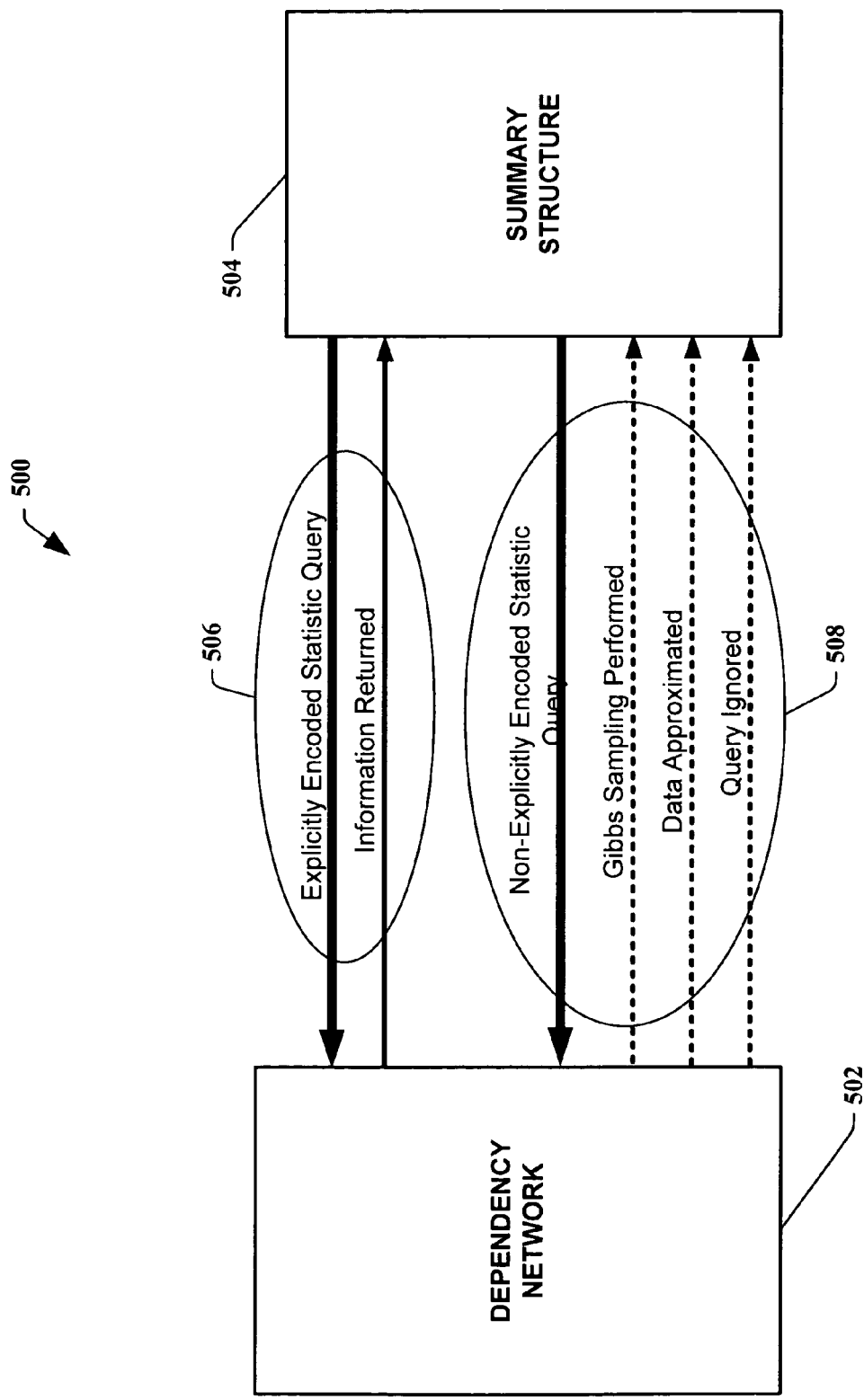
FIG. 5 is a block diagram of a model (or pattern) learning system in accordance with an aspect of the present invention.

Referring to FIG. 5, a block diagram of a model (or pattern) learning system 500 in accordance with an aspect of the present invention is illustrated. The learning system 500 is comprised of a dependency network 502 and a model (or pattern) 504. In this aspect of the present invention, a learning method includes explicitly encoded statistic queries 506 and non-explicitly encoded statistic queries 508. These queries 506, 508 allow the model (or pattern) 504 to be learned from the dependency network 502. For example, if a query is explicitly encoded in the dependency network 502, the information is returned directly 506. However, if the query is non-explicitly encoded in the dependency network 502, any number of means can be utilized to respond to the query 508. In this example, one of the possible means is to perform Gibbs sampling to formulate the required data. Another means can include approximating (or estimating) the data requested. Yet another means of responding includes ignoring the request altogether.

Figure 6:
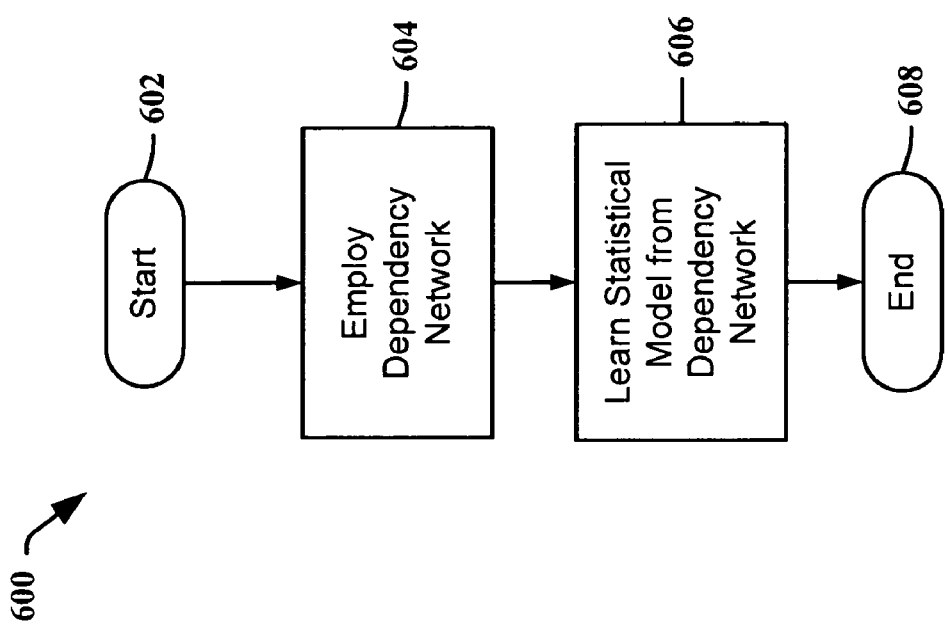
FIG. 6 is a flow diagram illustrating a method of learning a model (or pattern) in accordance with an aspect of the present invention.
Figure 7:
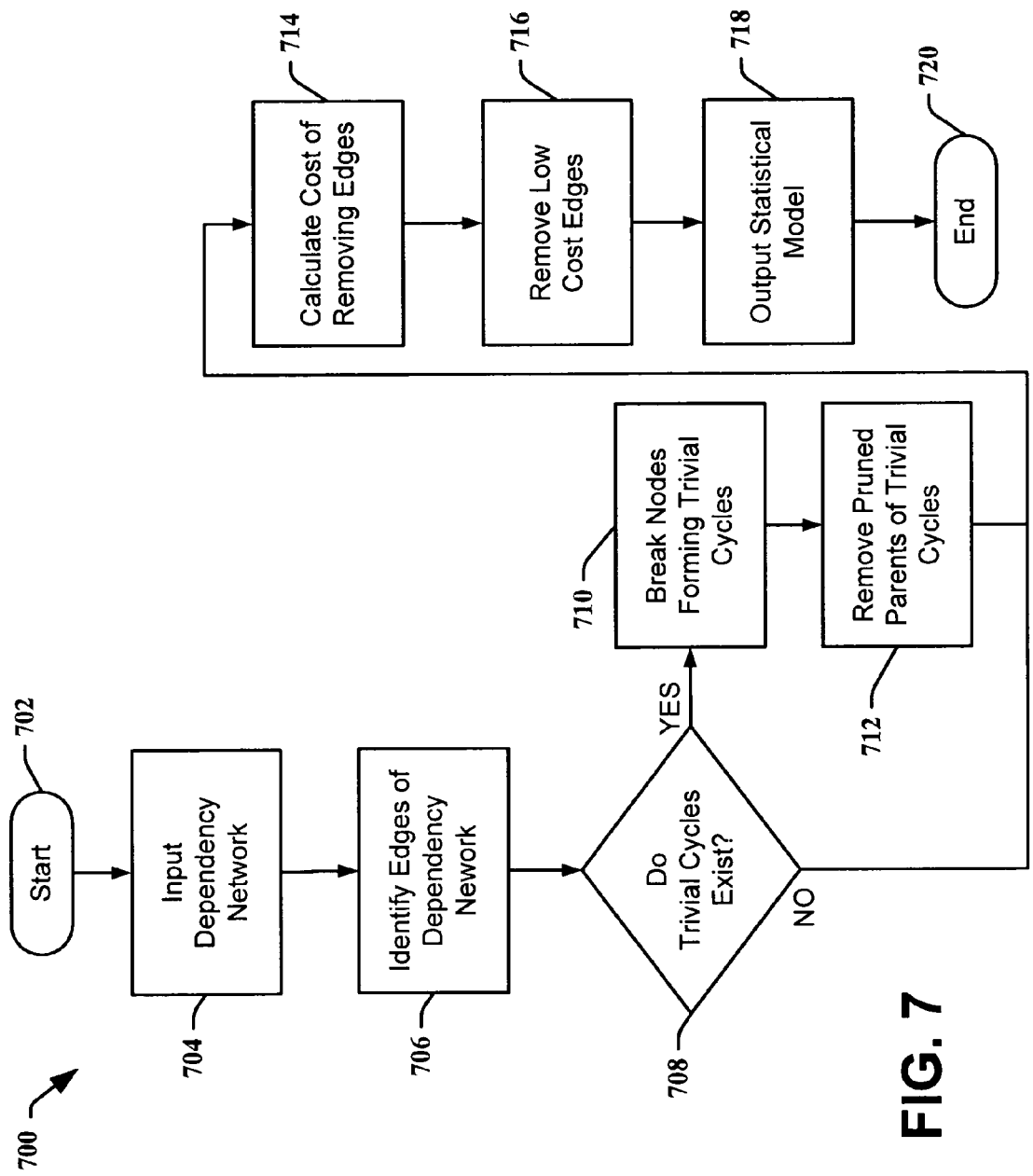
FIG. 7 is another flow diagram illustrating a method of learning a model (or pattern) in accordance with an aspect of the present invention.
Figure 8:
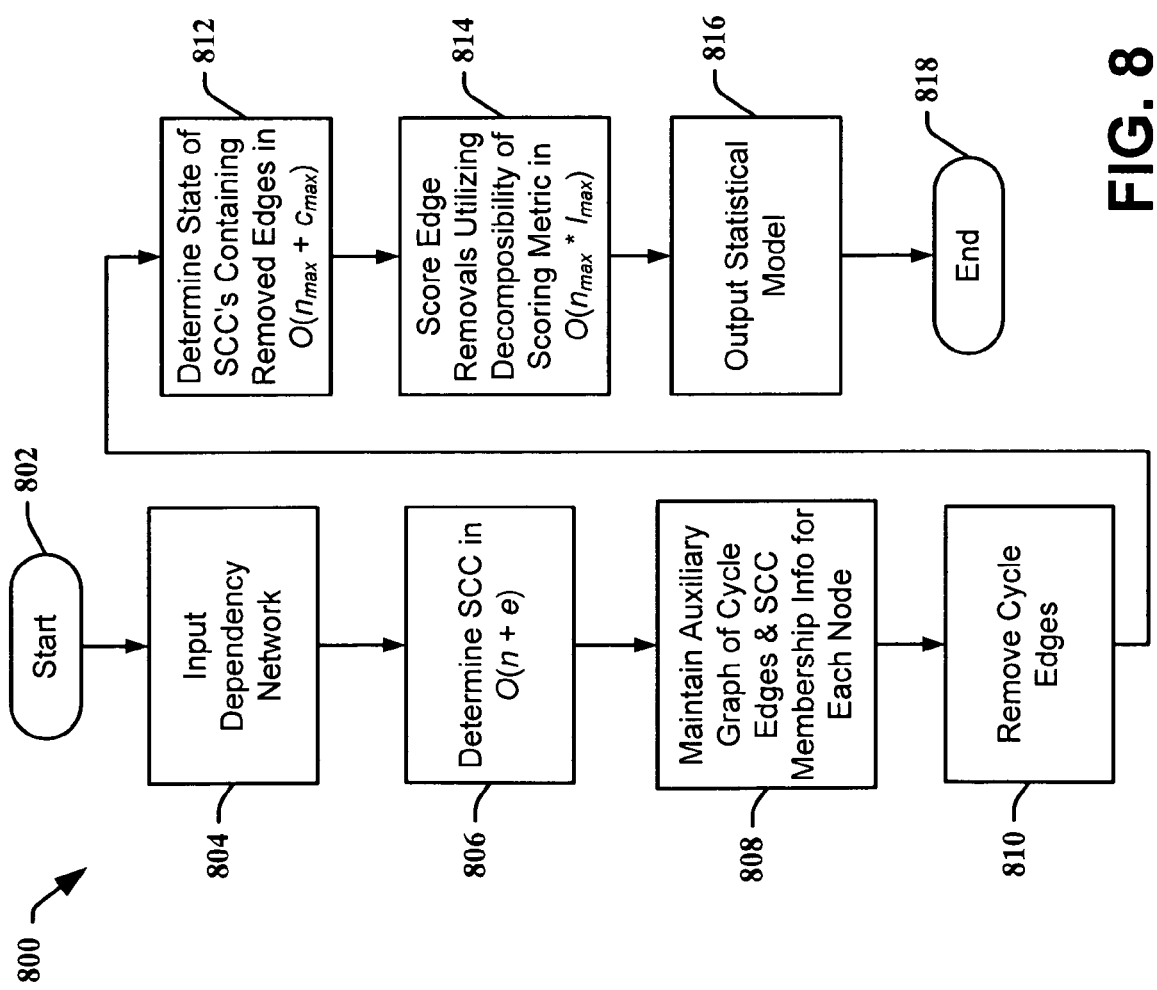
FIG. 8 is yet another flow diagram illustrating a method of learning a model (or pattern) in accordance with an aspect of the present invention.

In view of the exemplary systems shown and described above, methodologies that may be implemented in accordance with the present invention will be better appreciated with reference to the flow charts of FIGS. 6-8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 6, a flow diagram illustrating a method 600 of learning a model (or pattern) in accordance with an aspect of the present invention is shown. The method 600 starts 602 with employing a dependency network to summarize data from a data set 604. A statistical model is then learned from the dependency network such that it forms a model (or pattern) 606, ending the flow 608. The statistical models (models (or patterns)) can be Bayesian networks, Markov networks, neural networks, SVMs, and naïve Bayes and the like depending on an aspect of the present invention. Conditional distributions utilized within an aspect of the present invention for a model (or pattern) can include machine learning techniques such as decision trees, naïve Bayes, neural networks, SVMs, logistic and linear regressions, and complete tables and the like. The models (or patterns) allow queries about the data set to be answered without having to access the data set. This eliminates, among other things, the time required to access and search an extremely large data set. Information can be extracted from a data set (or "structure") by utilizing explicit data found in the dependency network, by going directly to the data set and accessing data, and/or by deriving (or "inferencing") data with Monte Carlo sampling techniques such as Gibbs sampling and the like. In the present invention, the conditional distributions of the model (or pattern) are not required to match the conditional distributions of the dependency network.

Turning to FIG. 7, another flow 700 diagram illustrating a method of learning a model (or pattern) in accordance with an aspect of the present invention is depicted. The flow starts 702 with inputting a dependency network 704. Edges of the dependency network are then identified 706. A determination is made as to whether trivial cycles (a cycle length of two) exist in the dependency network 708. If trivial cycles do exist, the nodes forming the trivial cycles are broken 710 and the pruned parents of the trivial cycle are removed 712. If there are no trivial cycles (or after the pruned parents are removed), the cost of removing the existing edges is calculated 714. This calculation can include, but is not limited to, identifying every sub-tree of a decision tree $T_j$ that is rooted by a node splitting from a node $X_i$, replacing the sub-trees with leaves creating a new decision tree, computing sufficient statistics for the leaves by combining sufficient statistics corresponding to the leaves of the replaced sub-trees, evaluating a local score of the decision tree $T_j$ against a local score of the new decision tree to establish a cost, and selecting an edge with the lowest cost for removal. After the cost has been determined, the low cost edges are removed 716. The statistical model is then output 718, ending the flow 720.

Turning to FIG. 8, yet another flow 800 diagram illustrating a method of learning a model (or pattern) in accordance with an aspect of the present invention is depicted. One aspect of the present invention removes one edge of a dependency network with each iteration of processing and requires O(c) removals to break all cycles, where c is the number of edges involved in cycles in an input graph. The flow 800 starts 802 with inputting a dependency network learned from a data set 804. A determination is made as to which components of a graph are strongly connected (strongly connected components—"SCC") in time O(n+e), where n is the number of nodes and e represents the cycle edges 806 (see *Introduction to Algorithms* by T. H. Cormen, C. E. Leiserson, and R. L. Rivest; The MIT press, 1990). An auxiliary graph is maintained of the cycle edges and SCC membership information for each node 808. This allows for acceleration of the iterations required for learning a model (or pattern) after a first iteration has been completed. Edges of cycles are then removed 810. A determination is then made of the state of the SCC's which contain removed edges in time $O(n_{max}+c_{max})$ 812. This allows the SCC algorithm to only be processed for the SCC that contained the removed edge. Thus, maintaining the edges takes $O(n_{max}+c_{max})$ time, where $n_{max}$ and $c_{max}$ are the number of nodes and cycle edges (respectively) in the largest SCC. The edge removals are then scored utilizing decomposability of a scoring metric in time $O(n_{max}*l_{max})$ 814. Scoring an edge removal requires time proportional to the number of leaves in the sub-trees it prunes. This scoring can be accelerated using the decomposability of the present invention's scoring metric. In particular, only the scores of edges pointing to $X_j$ must be updated after removing edge $X_i \rightarrow X_j$. The number of such affected edges is bounded by the number of nodes in $X_j$'s SCC. Therefore, the time for this step is bounded by $O(n_{max}*l_{max})$, where $l_{max}$ is the number of leaves in the largest decision tree. The statistical model (model (or pattern)) is then output 816, ending the flow 818. This method allows the model (or pattern) learning to be bounded by $O(c*(c_{max}+n_{max}*l_{max}))$, independent of the size of the data set.

As an example of one aspect of the present invention, a Bayesian network is learned from a summary of complete data (e.g., no missing values) in the form of a dependency network rather than from data directly. This method allows a user to gain the advantages of both representations: scalable techniques for learning dependency networks and convenient inference with Bayesian networks. The dependency network is employed as an "oracle" for the statistics needed to learn the Bayesian network. Typically, the problem is NP-hard ("NP" is the class that a Nondeterministic Turing machine accepts in Polynomial time, and the complexity class of decision problems that are intrinsically harder than those that can be solved by a nondeterministic Turing machine in polynomial time are "NP-hard".) and a greedy search method is utilized. The prediction accuracy of the Bayesian network constructed from one aspect of the present invention's method closely equals that of Bayesian networks learned directly from the data.

Dependency networks, described by D. Heckerman, D. M. Chickering, C. Meek, R. Rounthwaite, and C. Kadie in "Dependency Networks for Inference, Collaborative Filtering, and Data Visualization" (*Journal of Machine Learning Research*, 1:49-75, October 2000), are graphical models that are similar to Bayesian networks. They differ in that their graphical structures are not required to be acyclic. Each node in a dependency network contains a conditional probability given its parents in the network, and a dependency network defines a joint probability distribution over the corresponding domain by means of Gibbs sampling (as described by Heckerman et al., 2000).

An advantage of dependency networks is that—using the approximate method described in Heckerman et al. (2000)— they are generally easier to learn from complete data than are Bayesian networks. Namely, a user can learn a conditional probability distribution for each node in isolation, employing any standard classification or regression algorithm (possibly in conjunction with explicit feature selection) to select parents for the node and populate the associated parameter values. Furthermore, there are many classification/regression learning algorithms that have been scaled up for large data sets. These algorithms can easily be applied to produce scalable algorithms for learning dependency networks with the associated local models. However, it is not apparent how these scalable algorithms can be modified to respect the graphical constraints imposed by Bayesian networks. Some examples on scaling up learning Bayesian networks for the case when local models contain complete conditional probability tables, include: "Learning Bayesian Network Structure from Massive Datasets: The "Sparse Candidate" Algorithm" by N. Friedman, I. Nachman, and D. Peér found in *Proceedings of the Fifteenth Conference on Uncertainty in Artificial Intelligence*, pages 206-215, Morgan Kaufmann, 1999 and VFBN (Very Fast Bayesian Networks) as described in "Mining Complex Models From Arbitrarily Large Databases in Constant Time" by G. Hulten and P. Domingos found in *Proceedings of the Eighth ACM SIGKDD International Conference on Knowledge Discovery and Data Mining*, pages 525-531, Edmonton, Alberta, Canada, 2002 (ACM Press). However, the scalability of these algorithms is hampered by the fact that the size of a conditional probability table grows exponentially with the number of parents of a node.

Bayesian networks have some advantages over dependency networks: the factored form of their joint distribution leads to efficient inference algorithms, whereas the Gibbs sampling that is often needed to extract probabilities of interest from a dependency network is slow. Occasionally, when the Bayesian network structures are reasonably simple, algorithms for exact inference can be applied. For more complex structures, approximate inference techniques can be utilized such as loopy propagation (e.g., K. P. Murphy, Y. Weiss, and M. Jordan; "Loopy Belief Propagation for Approximate Inference: An Empirical Study" found in *In Proceedings of the Fifteenth Annual Conference on Uncertainty in Artificial Intelligence*; Morgan Kaufmann, 1999) and variational methods (e.g., M. I. Jordan, Z. Ghahramani, T. S. Jaakkola, and L. K. Saul; "An Introduction to Variational Methods for Graphical Models" found in M. I. Jordan, editor, *Learning in Graphical Models*; MIT Press; Cambridge, Mass., 1999).

Learning Bayesian networks from dependency networks provides the advantages of both representations. In one aspect of the present invention, a dependency network is learned from (complete) data using a conventional, scalable algorithm, and then a Bayesian network is constructed to allow for a more convenient inference. Once the dependency network is available, the computational complexity of the algorithm that produces the Bayesian network is independent of the size of the original data set.

The present invention can employ a number of different means to construct a Bayesian network from a dependency network. The dependency network is employed as an "oracle" for the sufficient statistics needed to learn a Bayesian network. When a needed statistic is explicitly encoded in the dependency network, it is simply returned. When a needed statistic is not explicitly encoded in the dependency network it can be generated via Gibbs sampling, approximated, or ignored. One aspect of the present invention utilizes only Bayesian network structures whose corresponding sufficient statistics are explicitly encoded in the conditional probability distributions of the dependency network. This approach produces Bayesian network structures that are acyclic subgraphs of the dependency networks.

A disadvantage of an approach that constructs a Bayesian network from a dependency network is that any relation in the data that is not represented in the dependency network is likely not to be present in the Bayesian network learned from it. An alternate approach is to learn a model from sufficient statistics encoded in a Dynamic AD-tree (P. Komarek and A. Moore; "A Dynamic Adaptation of AD-Trees for Efficient Machine Learning on Large Data Sets"; found in *Proceedings of the Seventeenth International Conference on Machine Learning*, pages 495-502; Morgan Kaufmann, 2000). This representation contains enough information to calculate exact values for all of the joint statistics, and can be used to learn Bayesian networks. However, AD-trees typically use substantially more memory than dependency networks, require multiple scans of the data to learn (whereas learning a dependency network does not), and are often forced to perform extra data scans at query time to save memory.

The following syntactical conventions are utilized for an example of one aspect of the present invention. A variable is denoted by an uppercase token (e.g. A; $B_i$; Y; $\Theta$) and a state or value of that variable by the same token in lower case (e.g. a; $b_i$; y; $\theta$). Sets are denoted with bold-face capitalized tokens (e.g. A; $Pa_i$) and corresponding sets of values are denoted by bold-face lower case tokens (e.g. a; $pa_i$). Calligraphic tokens (e.g. $\zeta$; B) denote statistical models and graphs.

Consider a domain of $\eta$ variables $X=\{X_1 \ldots X_\eta\}$. Dependency networks and Bayesian networks both (1) encode assertions about the dependencies and independencies that hold among the variables in X and (2) contain local probability distributions that characterize a joint probability distribution over X. More specifically, both are directed graphical models (S; $\Theta$) where S is the structure of the model and $\Theta$ its corresponding set of parameters. The structure S contains both (1) a directed graph, whose nodes are in one-to-one correspondence with the variables in X, and whose (lack of) edges represent the global (independence) constraints among those variables and (2) any local constraints that exist in the conditional distributions corresponding to each variable (e.g. the constraints imposed by the structure of a decision-tree). The parameters, $\Theta$, combined with the global and local constraints, define a joint probability distribution p(X). $X_i$ is used to denote both the variable and the corresponding node in a graphical model. $Pa_i$ is used to denote the parents of $X_i$ in a graphical model.

A Bayesian network $B=(S_B, \Theta_B)$ is a directed graphical model for which the associated directed graph is acyclic. The model encodes the conditional independence constraints that each node is independent of its non-descendants given its parents. The result of these constraints is that the joint distribution over X can be factored as follows:

$$p(x_1, \ldots, x_n | S_B) = \prod_{i=1}^{n} p(x_i | pa_i, \Theta_B) \quad (1)$$

where $pa_i$ is the set of values for $Pa_i$ within $x_1 \ldots x_\eta$.

A dependency network $\Delta=(S_\Delta, \Theta_\Delta)$ is similar to a Bayesian network, except that the associated directed graph is not necessarily acyclic. The model encodes the conditional independence constraints that each node is independent of all other nodes in X given its parents. The model stores, for each node $X_i$, the probability distribution:

$$p(X_i | Pa_i, \Theta_B) = p(X_i | X \setminus X_i, \Theta_B) \quad (2)$$

As shown by Heckerman et al. (2000), the set of all conditional probability distributions defined by Equation (2) collectively define a joint probability distribution $p(X|S_\Delta; \Theta_\Delta)$ by means of Gibbs sampling.

There are many conventional algorithms for learning Bayesian networks from data. "A Guide to the Literature on Learning Probabilistic Networks from Data" by W. L. Buntine (IEEE Transactions on Knowledge and Data Engineering, 8:195-210, 1996) provides a good review of the literature, "A Tutorial on Learning Bayesian Networks" by D. Heckerman (Technical Report MSR-TR-95-06, Microsoft Research, 1996) presents a tutorial on the topic, and *Learning in Graphical Models*, volume 89 (M. Jordan, editor; Kluwer, Boston, Mass.; NATO ASI, Series D: Behavioural and Social Sciences edition, 1998) contains some introductory articles and more recent advances. In one popular class of algorithms, the so called search-and-score algorithms, a search algorithm is used in conjunction with a scoring criterion to evaluate the fit of candidate models to the data. Once a good structure is identified, the corresponding parameters are estimated in a straightforward manner.

The scoring criterion and parameter estimates of search-and-score algorithms are based on sufficient statistics of the data. The sufficient statistics of the data for a given model are a summary of the data that is sufficient to both compute the score and estimate the parameters of a model. For example, if all variables in X are discrete and the graph is empty, then the sufficient statistics for the model are the marginal counts of each variable of $X_i$.

An assumption made by many Bayesian network learning algorithms is that the parameters associated with each variable are mutually independent. Given this assumption and a complete data set, the parameters remain mutually independent a posteriori, and the structure score can be written as the sum of independent sub-scores, one for each conditional distribution in the model. In addition, the sufficient statistics can be decomposed into sufficient statistics for individual conditional probability distributions. For example, when learning a Bayesian network for discrete variables, the counts needed to evaluate the entire network can be written as the union of the counts needed to estimate each conditional distribution. In general, when these properties hold, the scoring criterion is said to be decomposable.

Heckerman et al. (2000) describe an approach for learning dependency networks from complete data. The basic idea behind this approach is to learn each conditional distribution associated with the dependency network separately. That is, $p(x_i|X \setminus x_i)$ for each $x_i$ is learned independently using some probabilistic classification/regression model. An important issue with this approach is the consistency of the learned distributions. The set of conditional distributions associated with a dependency network is said to be consistent if there exists a joint distribution for X from which each conditional can be obtained via the rules of probability. It is not difficult to see that the independent learning of conditional distributions may lead to inconsistencies. For example, due to small-data effects, a learned decision tree that predicts Y may not split on X, whereas a learned decision tree for X may split on Y. Nonetheless, Heckerman et al. (2000) argue that, for reasonably large data sets, the local distributions will be "almost consistent" (described formally in their paper), because each is learned from the same set of joint data.

This heuristic method for learning dependency networks is utilized as a means in one aspect of the present invention for constructing a Bayesian network from a dependency network. Because each conditional distribution in the dependency network is learned separately, each distribution can associate a set of sufficient statistics that can then be applied to the construction of the Bayesian network using a decomposable scoring criterion. Note that the space needed to store sufficient statistics for each conditional distribution is typically on the same order as the space needed to store the parameter values themselves.

Another aspect of the present invention employs a means in which a learning algorithm is utilized under the assumption that the conditional distributions in both dependency networks and Bayesian networks are represented with decision trees. A decision tree, $T_i$, is a tree-structured local model that represents the conditional probability for a singleton target variable $X_i$ given its parents $Pa_i$. Each internal node in the tree contains a test on one of parent variables and has one child for each possible outcome of the test. Corresponding to each leaf is a probability distribution over $X_i$ that is specified by the parameters $\Theta$ of the Bayesian network or dependency network. Every path from the root of a decision tree to a leaf passes through some number of internal nodes. Combining these node tests selects a subspace of the space defined by the values of $Pa_i$, and each leaf models the distribution for $X_i$ in one of these subspaces. Notice that these subspaces are non-overlapping and that their union is the space spanned by the values of $Pa_i$.

The parameters associated with each leaf of a decision tree are assumed to be mutually independent. This assumption will typically be incoherent for dependency networks, but will produce additional decomposition of the model scores.

A dependency network's information can be utilized in different ways to learn a Bayesian network. One skilled in the art can appreciate that the present invention can employ any of these methods. For the sake of brevity, an example of one aspect of the present invention is illustrated for Bayesian networks whose sufficient statistics are explicitly represented in the dependency network. This illustration limits the Bayesian network structures that can be scored, and thus limits the search space used for learning. The set of Bayesian networks that can be scored is determined by examining the conditional probability distributions used by the dependency network. For instance, any Bayesian network can be evaluated that is an acyclic sub-graph of the dependency network when all variables in the domain are discrete and the conditional distributions are unconstrained multinomials. The sufficient statistics for $p(X_i|Pa_i)$ can be derived easily from the sufficient statistics for $p(X_i|Pa_i)$ if $Pa_i \subseteq Pa_i$). When the conditional distribution has local structure (e.g., a decision tree), additional restrictions apply.

The resulting set of scored Bayesian networks can be explored with several methods. Finding the optimal method is NP-hard, and, consequently, it is appropriate to apply heuristic search techniques. Two obvious search strategies are to start from an empty Bayesian network and add edges from the dependency network until further additions create cycles; and to start from the dependency network and remove edges until there are no cycles. The latter, as an example, is discussed in more detail infra.

Given the result supra, it is appropriate to apply a heuristic search technique to identify a high-scoring Bayesian network structure from the dependency network. A greedy implementation of the learning technique is described for the special case when the conditional distributions are decision trees.

Although one skilled in the art can appreciate that there are numerous greedy approaches that could be applied, for brevity, a simple technique that repeatedly removes edges from the dependency network (along with the associated splits from the decision trees) until the resulting graph is acyclic is illustrated for one aspect of the present invention. This approach simplifies the dependency network until the first valid Bayesian network structure is encountered, and that first structure is returned by the technique.

One aspect of the present invention employs a method utilizing the simplified approach which, for purposes of easy reference, is called "DN2BN." DN2BN takes as input a dependency network $\Delta$ and outputs a Bayesian network. In order to remove the edge $X_i \to X_j$, the decision tree $T_j$ must be modified so that none of its internal nodes test Xi. This modification will presumably reduce the quality of $T_j$—measured by the component of the decomposable scoring function local to $X_j$—by forcing it to take advantage of less information. DN2BN removes the minimum-cost set of edges from $S_\Delta$ so that it no longer contains cycles.

Table 1 contains pseudo-code for DN2BN. The structures of the input dependency network and the output Bayesian network specify the graphical structure and the structure of the decision trees (but not their parameters). The method identifies all edges that are involved in cycles in $S_B$. Removing edges that are not involved in cycles is not necessary. There is a cost of removing these edges as it reduces the quality of some node's decision tree, but there is no benefit as it does not make progress towards removing cycles from $S_B$. Therefore, in this one aspect of the present invention, DN2BN does not remove non-cycle edges.

TABLE 1

Pseudo-code for DN2BN

Input: A dependency network $\Delta = (S_\Delta, \Theta_\Delta)$
Output: A Bayesian network structure $S_B$
Let $S_B = S_\Delta$
(Let $T_i$ denote the decision tree corresponding to node $X_i$ in $S_B$)
While there are cycles in $S_B$
    Let $E_{cycle}$ be the set of edges in cycles in $S_B$
    Find the cost of removing each edge in $E_{cycle}$
    Let $X_i \to X_j$ have lowest removal cost in $E_{cycle}$
    Remove $X_i \to X_j$ from $S_B$
        Update $T_j$ by pruning splits on $X_i$
        Let Par' (j) be the set of parents of $X_j$ that do not have
            splits in the new $T_j$
        For every $X_k \in$ Par' (j) remove $X_k \to X_j$ from $S_B$
Return $S_B$ The cost of removing each cycle edge is calculated in the following manner. When $X_i \to X_j$ is removed from $S_B$, $T_j$ must be modified so that none of its internal nodes test the value of $X_i$. DN2BN accomplishes this by identifying every sub-tree of $T_j$ that is rooted by a node splitting on $X_i$, and replacing these sub-trees with leaves. The sufficient statistics for the new leaves are computed by combining the sufficient statistics corresponding to the leaves of their deleted sub-trees. Given the decomposable scoring criterion used in Heckerman et al.'s (2000) heuristic learning method, each edge deletion is evaluated by taking the difference in local score between the new and old trees.

After scoring all of the edges, DN2BN selects the edge with lowest cost, removes it from $S_B$, and updates the appropriate decision tree. The new tree can be substantially smaller than the old one. In the worst case, when the edge $X_i \to X_j$ is removed and the root node of the original $T_j$ tests $X_i$, the resulting tree will be a single leaf. In this and other cases, some variables from $Pa_j$—other than the explicitly deleted $X_i$—may no longer participate in splits in $T_j$. The edges associated with these pruned parents are also removed from $S_B$ by the method.

An extension to this method takes advantage of an easily computed property: when $X_i$ is in $Pa_j$ and $X_j$ is in $Pa_i$, these two nodes form a cycle of length two and either $X_i \rightarrow X_j$ or $X_j \rightarrow X_i$ must be removed in order to make $S_B$ acyclic. DN2BN first greedily breaks all of these length-two cycles before considering any other edge removals. This modification simplifies and avoids removing some spurious edges, because removing a single edge from $S_B$ can break many cycles. In fact, breaking these trivial cycles (and removing pruned parents) often removes all cycles from the dependency network.

DN2BN repeats these steps until $S_B$ is acyclic and then terminates. DN2BN removes one edge in each iteration and requires O(c) removals to break all cycles, where c is the number of edges involved in cycles in the input graph. The complexity of the operations required in each of these iterations is now illustrated. The first operation, in each iteration, finds the set of edges involved in cycles in $S_B$. This operation can be done by finding the strongly connected components (SCCs) of the graph. Conventional techniques (see Cormen et al. 1990) can accomplish this in O(n+e) time. However, this can be accelerated in iterations after the first by maintaining an auxiliary graph containing just the cycle-edges and information about each node's SCC membership. Then, when an edge is removed, the SCC algorithm need only be run on the SCC that contained the removed edge. Thus, maintaining $E_{cycle}$ takes $O(n_{max}+c_{max})$ time, where $n_{max}$ and $C_{max}$ are the number of nodes and cycle edges (respectively) in the largest SCC. The second operation in each iteration scores the cost of removing each cycle edge. Scoring an edge removal requires time proportional to the number of leaves in the sub-trees it prunes. This scoring can be accelerated using the decomposability of the present invention's scoring metric. In particular, only the scores of edges pointing to $X_j$ must be updated after removing edge $X_i \rightarrow X_j$. The number of such affected edges is bounded by the number of nodes in $X_j$'s SCC. Therefore, the time for this step is bounded by $O(n_{max}*l_{max})$, where $l_{max}$ is the number of leaves in the largest decision tree. These two operations dominate the time of the remainder of DN2BN's operations; and the total time complexity is bounded by $O(c*(c_{max}+n_{max}*l_{max}))$. This is independent of the size of available training data. Existing scalable decision tree induction algorithms, such as VFDT (Very Fast Decision Tree) (described in "Mining High-Speed Data Streams" by P. Domingos and G. Hulten; In *Proceedings of the Sixth ACM SIGKDD International Conference on Knowledge Discovery and Data Mining*, pages 71-80; Boston, Mass., 2000; ACM Press), can be used to learn dependency networks in time that is independent of the size of available training data. Thus, Bayesian networks with decision trees for conditional distributions can be learned in a scalable manner.

Figure 9:
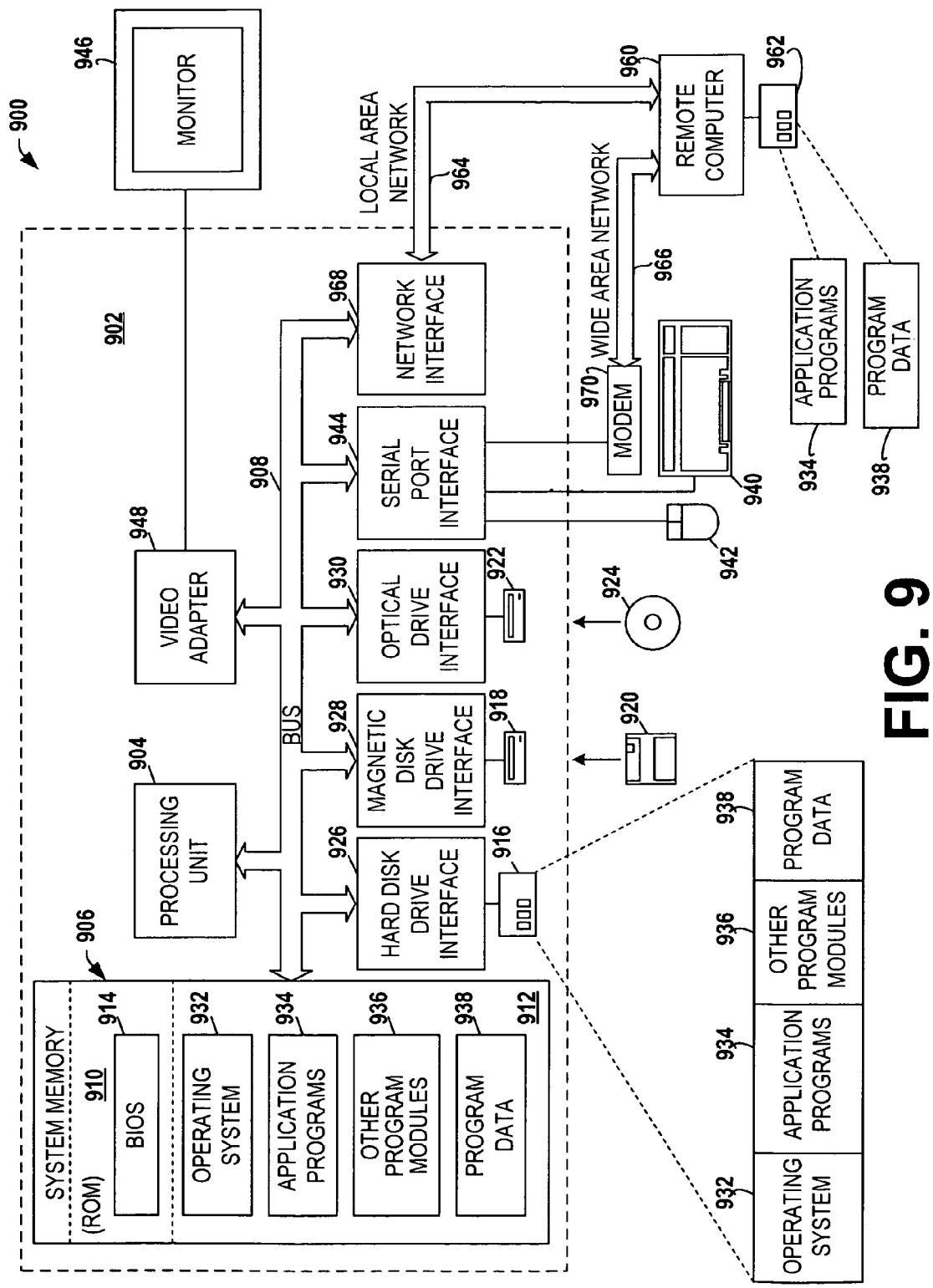
FIG. 9 illustrates an example operating environment in which the present invention can function.

In order to provide additional context for implementing various aspects of the present invention, FIG. 9 and the following discussion are intended to provide a brief, general description of a suitable computing environment 900 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 9, an exemplary system environment 900 for implementing the various aspects of the invention includes a conventional computer 902, including a processing unit 904, a system memory 906, and a system bus 908 that couples various system components, including the system memory, to the processing unit 904. The processing unit 904 may be any commercially available or proprietary processor. In addition, the processing unit may be implemented as multi-processor formed of more than one processor, such as may be connected in parallel.

The system bus 908 may be any of several types of bus structure including a memory bus or memory controller, a peripheral bus, and a local bus using any of a variety of conventional bus architectures such as PCI, VESA, Microchannel, ISA, and EISA, to name a few. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 910.

The computer 902 also may include, for example, a hard disk drive 916, a magnetic disk drive 918, e.g., to read from or write to a removable disk 920, and an optical disk drive 922, e.g., for reading from or writing to a CD-ROM disk 924 or other optical media. The hard disk drive 916, magnetic disk drive 918, and optical disk drive 922 are connected to the system bus 908 by a hard disk drive interface 926, a magnetic disk drive interface 928, and an optical drive interface 930, respectively. The drives 916-922 and their associated computer-readable media provide nonvolatile storage of data, data structures, computer-executable instructions, etc. for the computer 902. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 900, and further that any such media may contain computer-executable instructions for performing the methods of the present invention.

A number of program modules may be stored in the drives 916-922 and RAM 912, including an operating system 932, one or more application programs 934, other program modules 936, and program data 938. The operating system 932 may be any suitable operating system or combination of operating systems. By way of example, the application programs 934 and program modules 936 can include a model (or pattern) and/or a dependency network that utilizes a data set in accordance with an aspect of the present invention. Additionally, the program data 938 can include input data from which a model (or pattern) is generated and/or on which a query is performed in accordance with an aspect of the present invention.

A user can enter commands and information into the computer 902 through one or more user input devices, such as a keyboard 940 and a pointing device (e.g., a mouse 942). Other input devices (not shown) may include a microphone, a joystick, a game pad, a satellite dish, wireless remote, a scanner, or the like. These and other input devices are often connected to the processing unit 904 through a serial port interface 944 that is coupled to the system bus 908, but may be connected by other interfaces, such as a parallel port, a game port or a universal serial bus (USB). A monitor 946 or other type of display device is also connected to the system bus 908 via an interface, such as a video adapter 948. In addition to the monitor 946, the computer 902 may include other peripheral output devices (not shown), such as speakers, printers, etc.

It is to be appreciated that the computer 902 can operate in a networked environment using logical connections to one or more remote computers 960. The remote computer 960 may be a workstation, a server computer, a router, a peer device or other common network node, and typically includes many or all of the elements described relative to the computer 902, although, for purposes of brevity, only a memory storage device 962 is illustrated in FIG. 9. The logical connections depicted in FIG. 9 may include a local area network (LAN) 964 and a wide area network (WAN) 966. Such networking environments are commonplace in offices, enterprise-wide computer networks, intranets and the Internet.

When used in a LAN networking environment, for example, the computer 902 is connected to the local network 964 through a network interface or adapter 968. When used in a WAN networking environment, the computer 902 typically includes a modem (e.g., telephone, DSL, cable, etc.) 970, or is connected to a communications server on the LAN, or has other means for establishing communications over the WAN 966, such as the Internet. The modem 970, which can be internal or external relative to the computer 902, is connected to the system bus 908 via the serial port interface 944. In a networked environment, program modules (including application programs 934) and/or program data 938 can be stored in the remote memory storage device 962. It will be appreciated that the network connections shown are exemplary and other means (e.g., wired or wireless) of establishing a communications link between the computers 902 and 960 can be used when carrying out an aspect of the present invention.

In accordance with the practices of persons skilled in the art of computer programming, the present invention has been described with reference to acts and symbolic representations of operations that are performed by a computer, such as the computer 902 or remote computer 960, unless otherwise indicated. Such acts and operations are sometimes referred to as being computer-executed. It will be appreciated that the acts and symbolically represented operations include the manipulation by the processing unit 904 of electrical signals representing data bits which causes a resulting transformation or reduction of the electrical signal representation, and the maintenance of data bits at memory locations in the memory system (including the system memory 906, hard drive 916, floppy disks 920, CD-ROM 924, and remote memory 962) to thereby reconfigure or otherwise alter the computer system's operation, as well as other processing of signals. The memory locations where such data bits are maintained are physical locations that have particular electrical, magnetic, or optical properties corresponding to the data bits.

Figure 10:
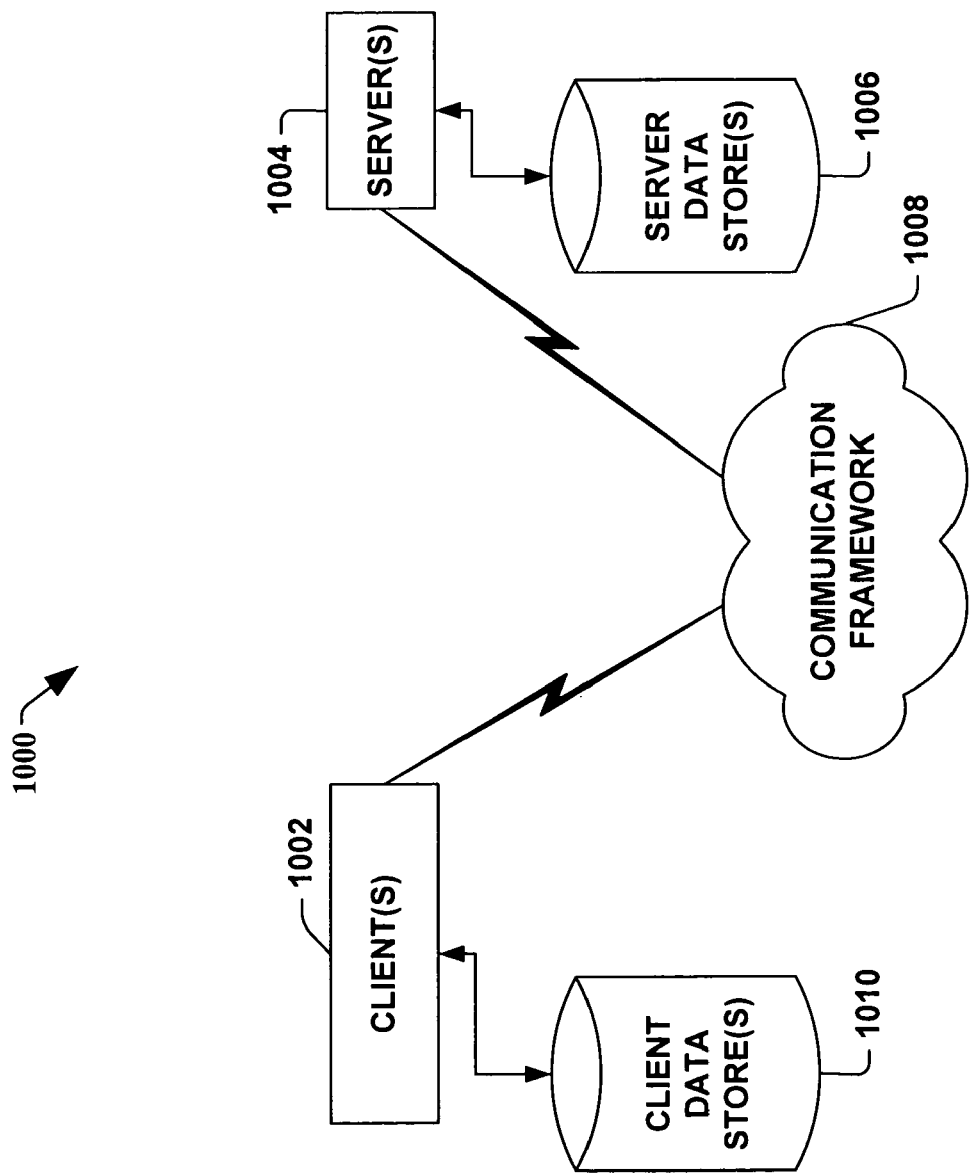
FIG. 10 illustrates another example operating environment in which the present invention can function.

FIG. 10 is another block diagram of a sample computing environment 1000 with which the present invention can interact. The system 1000 further illustrates a system that includes one or more client(s) 1002. The client(s) 1002 can be hardware and/or software (e.g., threads, processes, computing devices). The system 1000 also includes one or more server(s) 1004. The server(s) 1004 can also be hardware and/or software (e.g., threads, processes, computing devices). The servers 1004 can house threads to perform transformations by employing the present invention, for example. One possible communication between a client 1002 and a server 1004 may be in the form of a data packet adapted to be transmitted between two or more computer processes. The system 1000 includes a communication framework 1008 that can be employed to facilitate communications between the client(s) 1002 and the server(s) 1004. The client(s) 1002 are operably connected to one or more client data store(s) 1010 that can be employed to store information local to the client(s) 1002. Similarly, the server(s) 1004 are operably connected to one or more server data store(s) 1006 that can be employed to store information local to the servers 1004.

It is to be appreciated that the apparatus, systems and/or methods of the present invention can be utilized in an overall power conservation scheme facilitating computer components and non-computer related components alike. Further, those skilled in the art will recognize that the apparatus, systems and/or methods of the present invention can be employed in a vast array of electronic related technologies, including, but not limited to, computers, servers and/or handheld electronic devices and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable storage medium storing computer executable instructions for facilitating data access, the instructions comprising:

instructions for generating a dependency graph from a data set; and instructions for generating at least one statistical model directly from the dependency graph without accessing the data set, and when the at least one statistical model includes a Bayesian network, the Bayesian network has a structure that is acyclic sub-graphs of the dependency graph, wherein assuring that the Bayesian network has a structure comprising acyclic sub-graphs of the dependency graph includes:

determining which components of the dependency graph are strongly connected components (SCC);

maintaining an auxiliary graph of cycle edges and SCC membership information for each node of the dependency graph;
removing cycle edges of the dependency graph;
determining a state of SCC which contain removed edges in time; and
scoring edge removals utilizing decomposability of a scoring metric in time.

2. The medium of claim 1 further comprising instructions for displaying the at least one statistical model and/or the dependency graph.

3. The medium of claim 2 further comprising instructions for displaying an interface that allows a user to view the dependency graph and/or the at least one statistical model.

4. The medium of claim 3 wherein the instructions to generate the at least one statistical model, generate a plurality of statistical models.

5. The medium of claim 4 wherein the instructions for displaying an interface provide for selection between displaying the plurality of statistical models and the dependency graph.

6. The medium of claim 5 wherein the plurality of statistical models are selected from a group consisting of a Bayesian network, a Hidden Markov Model, a support vector machine (SVM), a neural network, a naive Bayes model, or some combination of these statistical models.

7. The medium of claim 1 wherein the at least one statistical model is selected from a group consisting of a Bayesian network, a Hidden Markov Model, a support vector machine (SVM), a neural network, and a naive Bayes model.

8. A computer-readable storage medium comprising:
instructions for analyzing a data set;
instructions for generating a dependency graph from the data set;
instructions for generating at least one statistical model from the dependency graph without accessing the data set, the instructions for generating the at least one statistical model comprising:
instructions for determining which components of the dependency graph are strongly connected components (SCC);
instructions for maintaining an auxiliary graph of cycle edges and SCC membership information for each node of the dependency graph;
instructions for removing cycle edges of the dependency graph;
instructions for determining a state of SCC which contain removed edges in time; and
instructions for scoring edge removals; and
instructions for displaying the at least one statistical model.

9. The medium of claim 8, further comprising:
instructions for displaying the dependency graph.

10. The medium of claim 8 further comprising:
instructions for querying the at least one statistical model.

11. The medium of claim 10 further comprising:
instructions for querying the dependency graph.

12. The medium of claim 11 further comprising:
instructions for comparing the results of the querying of the at least one statistical model and the querying of the dependency graph.

13. The medium of claim 12 further comprising:
instructions for displaying the results of the querying of the at least one statistical model, the results of the querying of the dependency graph and the results of the comparing.

14. The medium of claim 11 further comprising:
instructions for querying the data set.

15. The medium of claim 14 further comprising:
instructions for displaying the results of the querying of the data set.

16. A computer-readable storage medium having instructions stored thereon that, when executed by at least one processor, perform operations that facilitate data analysis, the operations comprising:
analyzing a data set;
generating a dependency graph based on some of the data in the data set;
generating at least one statistical model from the dependency graph without accessing the data set, the generating the at least one statistical model comprising:
identifying edges of the dependency graph;
determining whether trivial cycles exist in the dependency graph, wherein when trivial cycles do exist:
breaking nodes forming the trivial cycles; and
removing pruned parents of the trivial cycles;
calculating the cost of removing existing edges; and
removing low cost edges.

17. A computer-readable storage medium of claim 16, wherein the at least one statistical model consists of a Bayesian network, a Hidden Markov Model, a support vector machine (SVM), a neural network, and/or a naive Bayes model.

18. A computer-readable storage medium of claim 17, wherein the operations of generating further comprises generating a plurality of statistical models.

19. A computer-readable storage medium of claim 18, the operations further comprising displaying an interface to provide for selection of:
displaying the at least one statistical model or the dependency graph; and
displaying the at least one statistical model and the dependency graph.

* * * * *